(No Model.)

T. F. CLARK.
CAR BRAKE.

No. 469,963. Patented Mar. 1, 1892.

WITNESSES:
H. A. Carhart
C. B. Kinne

INVENTOR
Thomas F. Clark
BY
Smith & Denison
his ATTORNEYS

UNITED STATES PATENT OFFICE.

THOMAS F. CLARK, OF LANCASTER, NEW HAMPSHIRE.

CAR-BRAKE.

SPECIFICATION forming part of Letters Patent No. 469,963, dated March 1, 1892.

Application filed June 19, 1891. Serial No. 396,846. (No model.)

*To all whom it may concern:*

Be it known that I, THOMAS F. CLARK, of Lancaster, in the county of Coos, in the State of New Hampshire, have invented new and useful Improvements in Car-Brakes, of which the following, taken in connection with the accompanying drawings, is a full, clear, and exact description.

My invention relates to car-brakes.

My object is to produce a simple and inexpensive but effective car-brake in which the backward motion of the bumper and draw-bar incident to the reverse motion of the motive power is utilized to force the brake-shoe against the tread of the wheel.

My invention consists in the several novel features of construction and operation hereinafter described, and which are specifically set forth in the claims annexed. It is constructed as follows, reference being had to the accompanying drawings, in which—

Figure 1:
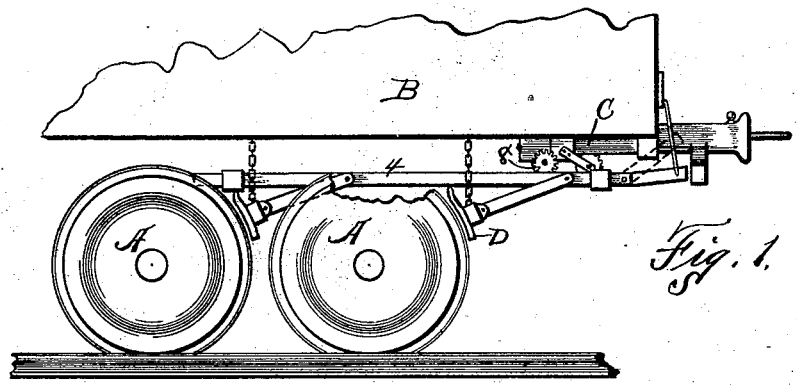
Figure 2:
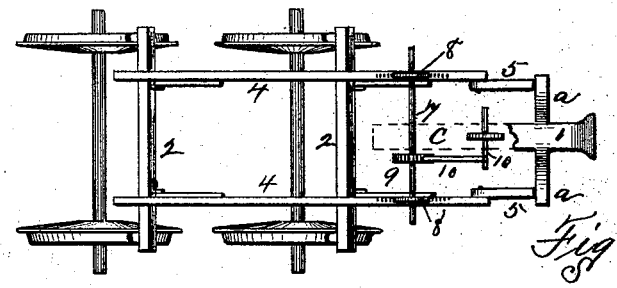
Figure 5:
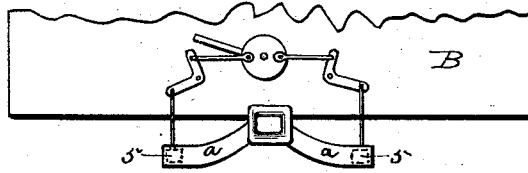
Figure 4:
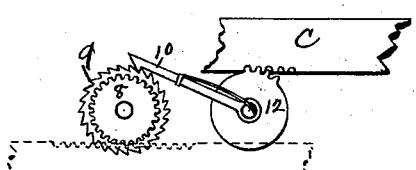
Figure 3:
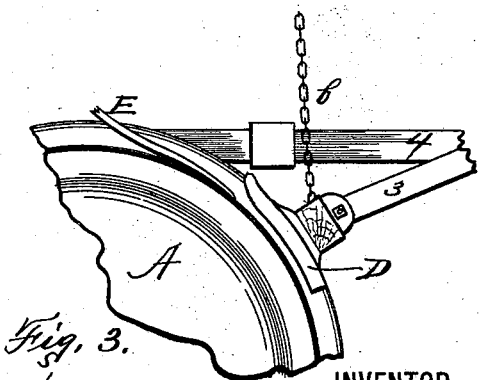

Figure 1 is a side view of the brake complete, showing the intermediate mechanism connecting it with the draw-bar and bumper and showing the latter in its extended position, ready for use. Fig. 2 is a top plan view thereof with the box of the car removed. Fig. 3 is an enlarged detail of a portion of the wheel, showing the brake. Fig. 4 is an end view of the bumper, showing means for raising the forward end of the draw-bar when it is desired to dispense with the operation of the brake. Fig. 5 is a view of the mechanism, showing means for locking the brake and releasing it from the forward movement of the draw-bar.

Similar letters and figures of reference indicate corresponding parts.

A are the wheels of the car or truck, upon which truck is mounted the box B in any ordinary way.

C is the draw-bar, being provided upon its forward end with a bumper 1, having side wings *a*, said draw-bar being secured at its rear end to the box or car-truck.

2 2 are cross-pieces supported yieldingly above the front edge of the tread of the wheel by downwardly and rearwardly extending arms 3, pivoted to the bar 4, and are also supported vertically by a chain *b* or other flexible support. The forward ends of the bars 4 are provided with pivoted extension-pieces 5, which when lying in a horizontal position abut with their forward ends against the side wings *a* of the bumper.

7 is a cross-shaft provided near its end with cog-wheels 8, engaging with a rack upon the upper face of the bar 4. Mounted upon the shaft 7 between the cogs 8 and at one side of the draw-bar is a ratchet-wheel 9, rigidly secured upon the shaft 7, and engaging with said ratchet-wheel is a spring-actuated pawl 10, secured to a shaft 11, upon which is mounted the wheel 12, with cogs in its upper edge engaging with the ratchet upon the lower face of the draw-bar, for the purpose hereinafter set forth.

Upon the front end of the box of the car I erect suitable means for raising the forward end of the extension 5 for the purpose of throwing the bar 4 out of engagement with the wings 5.

My invention is operated as follows: When the car is moving forward, the parts above described take the position shown in Fig. 1. Then when the engine reverses the motive power each car strikes against the bumper on the rear car, forcing the bumper and draw-bar C and the bars 4 backward, which causes the shoe D, suspended from the bar 4, to be pressed and firmly held against the tread of the wheel, thereby utilizing the force caused by the checking and backing of the cars as a power for setting the brakes. When the draw-bar C and the bars 4 are forced rearward by the slacking or reversing motion of the train, the bars 4 rotate the shaft 7, and the pawl 10, engaging with the ratchet 9, blocks the shoe against the tread of the wheel. When the train again moves forward, the spring-actuated pawl is released by the forward movement of the draw-bar C, engaging with the ratchets in the roller 12, and this in turn allows the bars 4 to move forward, disengaging the shoe from the wheel. If it is desired to back the train after the wheels have once been set, as above described, the extension-pieces 5 may be released, as above described, and when the cars are pushed backward the wheels A rotate in the reverse motion and the shoe D is carried upon the guard E, suspended upon the upper edge of the tread.

What I claim as my invention, and desire to secure by Letters Patent, is—

1. The herein-described brakes for cars, consisting of cross-bars 2, having brake-shoes suspended therefrom, said cross-bars 2 being supported by bars 4, engaging at their forward ends with the wings of the draw-bar, and the draw-bar secured at its rear end to the car and provided on its forward end with a bumper, as set forth.

2. The herein-described brakes for cars, consisting of the cross-bars 2, having brake-shoes suspended therefrom, said bars 2 being supported by the bars 4, having their forward ends engaging with the wing of the draw-bar, the draw-bar C, secured at its rear end to the car and having a bumper in its forward end, a shaft 7, having cog-wheels engaging with ratchets upon the bars 4, and a ratchet-wheel secured upon said shaft, engaging with the spring-actuated pawl 10, mounted upon the shaft 11, said shaft carrying a wheel having ratchets in its upper edge engaging with the ratchets upon the draw-bar, the shaft 11, and draw-bar C, in combination, as set forth.

In witness whereof I have hereunto set my hand this 15th day of June, 1891.

THOMAS F. CLARK.

In presence of—
  W. P. BUCKLEY,
  NEIL B. DREW.